United States Patent
Sjöblom

(10) Patent No.: US 7,254,561 B1
(45) Date of Patent: Aug. 7, 2007

(54) METHOD AND DEVICE FOR PERFORMING ELECTRONIC TRANSACTIONS

(75) Inventor: Hans Sjöblom, Rydebäck (SE)

(73) Assignee: Comex Electronics AB, Täby (SE)

( * ) Notice: Subject to any disclaimer, the term of this patent is extended or adjusted under 35 U.S.C. 154(b) by 615 days.

(21) Appl. No.: 09/423,511

(22) PCT Filed: May 14, 1998

(86) PCT No.: PCT/SE98/00897

§ 371 (c)(1),
(2), (4) Date: Nov. 10, 1999

(87) PCT Pub. No.: WO98/52151

PCT Pub. Date: Nov. 19, 1998

(30) Foreign Application Priority Data

May 15, 1997 (SE) .................................. 9701814

(51) Int. Cl.
*G06Q 90/00* (2006.01)
(52) U.S. Cl. ............................ 705/65; 902/2
(58) Field of Classification Search ............ 705/64–67, 705/75, 78, 41; 713/181–185; 380/282; 902/1–10; 725/6
See application file for complete search history.

(56) References Cited

U.S. PATENT DOCUMENTS

| | | | |
|---|---|---|---|
| 4,529,870 A * | 7/1985 | Chaum ........................ 235/380 |
| 4,656,474 A | 4/1987 | Mollier et al. ................ 380/23 |
| 4,825,050 A | 4/1989 | Griffith et al. |
| 4,849,613 A | 7/1989 | Eisele ........................ 235/379 |
| 4,926,480 A | 5/1990 | Chaum ........................ 380/23 |
| 5,130,519 A | 7/1992 | Bush et al. ................. 235/380 |
| 5,227,612 A | 7/1993 | Le Roux |
| 5,406,619 A * | 4/1995 | Akhteruzzaman et al. .... 379/95 |
| 5,502,765 A | 3/1996 | Ishiguro et al. ................ 380/24 |
| 5,625,695 A | 4/1997 | M'Raihi et al. |
| 5,649,118 A * | 7/1997 | Carlisle et al. ............. 395/241 |
| 5,694,471 A | 12/1997 | Chen et al. |
| 5,721,781 A | 2/1998 | Deo et al. ..................... 380/25 |
| 5,781,723 A * | 7/1998 | Yee et al. .................... 395/186 |
| 5,793,027 A | 8/1998 | Baik |
| 5,887,266 A * | 3/1999 | Heinonen et al. ........... 455/558 |
| 5,910,989 A | 6/1999 | Naccache |
| 5,942,738 A | 8/1999 | Cesaire et al. |
| 5,943,423 A * | 8/1999 | Muftic ........................ 380/25 |
| 5,960,084 A * | 9/1999 | Angelo ........................ 380/25 |
| 6,038,551 A * | 3/2000 | Barlow et al. ................ 705/41 |

(Continued)

FOREIGN PATENT DOCUMENTS

| | | | |
|---|---|---|---|
| EP | 0166541 | 1/1986 | ...................... 86/1 |
| EP | 0214609 | 3/1987 | .................... 87/12 |
| EP | 0385400 | 9/1990 | .................... 90/36 |
| EP | 0 624 014 A2 * | 9/1994 | |
| EP | 0807911 | 11/1997 | |

(Continued)

OTHER PUBLICATIONS

Mace, "Cards Holds Key to On-line Security", Nov. 14, 1994, InfoWorld, n16n46, p. 6, ISSN: 0199-6649.*

(Continued)

*Primary Examiner*—Mary D. Cheung
(74) *Attorney, Agent, or Firm*—Albihns Stockholm AB

(57) ABSTRACT

A method and a device for carrying out electronic transactions. A sender produces, under his own full control, a transaction message in a smart card (1) and provides the message with his digital signature in the card for subsequent output and transmission.

21 Claims, 7 Drawing Sheets

FOREIGN PATENT DOCUMENTS

| GB | 2291237 | 1/1996 |
|---|---|---|
| JP | 03026126 | 2/1991 |
| JP | 09062596 | 3/1997 |
| JP | 09116960 | 5/1997 |
| SE | 506506 | 10/1996 |
| WO | WO 91/16691 | 10/1991 |
| WO | WO 93/08545 | 4/1993 |
| WO | WO 96/24997 | 8/1996 |
| WO | WO 96/25814 | 8/1996 |
| WO | WO 96/33567 | 10/1996 |
| WO | WO 97/05729 | 2/1997 |
| WO | WO 98/03943 | 1/1998 |
| WO | WO 98/25220 | 6/1998 |
| WO | WO98/252220 | 6/1998 |

OTHER PUBLICATIONS

K. Rihaczek, publ. 1987 by "Computer Network and ISDN Systems" vol. 13, No. 3, published by TeleTrust Sverige. (www.teletrust.se).

"Project Strategisk Samverkan" publ. 1994 by Telia Sonera.

Appleby C: "Making Security A Reality For All", Information WEEK, No. 508, p. 38-40, Jan. 2, 1995; ISSN: 8750-6874.

Boly J-P et al.: "The ESPRIT Project CAFE"; ESORICS 94; 1-14; LNCS 875, Springer-Verlag, Berlin 1994.

Krayem-Nevoux et al.: "Payphone service for third generation mobile systems" Proceeding of Globecom '93; vol. 3; p. 1708-1712, 1993; ISBN: 0780309170.

Lemme H: "The microcomputer in the wallet"; Elektronik, vol. 42; No. 20, Oct. 5, 1993, ISSN: 0013-5658.

Part IV—Security Aspects: 1 Static Data Authentication; Jun. 30, 1996.

Haller & Atkinson: "On Internet Authentication" RFC 1704, Network Working Group, Oct. 1994.

Simon Corell: "Ca-policies in practical use"; Teletrust, May 23, 1996.

NIST Special Publication 800-7, Security in Open Systems; publ 1994.

PROJECT MobiDIC, System Analysis, version 1-2, publ 17 Jan. 1997.

"SmartCard Guide. En värld av personifierade tjänster och service" by Magnus Andersson and Petter Ljunggren, May 1995.

"Juridiskt accepterand digital signatur utsikter och möjligheter, en studie åt PostNet" by Mats Larsson, autumn 1994.

"Utgivning och Hantering av Nyckelbärande Kort" report by TeleTrust Sverige, distributed by Spri, Gunnar Klein, GKAB and Håkan Persson, AU-System, May 25, 1994.

"Informationssäkerhet och digital signering", offprint of swedish TELE Apr. 1991.

"CA-policies in practical use", TeleTrusT Association, May 1996.

Bowry, Kavita "Smart Cards Get Clever Applications", Telecommunications, Nov. 1993 pp. 47-49.

* cited by examiner

METHOD AND DEVICE FOR PERFORMING ELECTRONIC TRANSACTIONS

FIELD OF THE INVENTION

The present invention relates to electronic transactions, i.e. primarily payments, which are effected electronically. More specifically, the invention concerns electronic transactions effected while employing a user card, such as a cash card, credit card, charge card, or the like, said card being a so-called smart card.

BACKGROUND ART

In recent years, the interest in electronic transactions has increased significantly, especially concurrently with the impact of the Internet. Security matters have been focused, and different systems and standards have been suggested to guarantee the security in connection with electronic transmission of transaction messages. A matter that has attracted a lot of interest is how to protect, for instance, credit card numbers transmitted via the Internet in connection with Internet shopping. What the systems and standards proposed have in common is that they are based either on the condition that sensitive information that may be misused, for instance a credit card number, is not to be transmitted via the communications network, or on the condition that such sensitive information is to be transmitted in encrypted form. In both alternatives, the relatively complicated administrative routines and system configurations etc. are focused, which, as will be appreciated, results in restrictions and obstacles to a more general use.

OBJECTS OF THE INVENTION

A main object of the present invention is to facilitate electronic transactions in a simplified fashion while maintaining full security.

A further object is to facilitate different kinds of electronic transactions within the scope of the same basic concept.

One more object is to facilitate electronic transactions independently of the choice of information transfer channel for the used transaction message.

A still further object is to facilitate electronic transactions which basically do not require transmission of the used transaction message through a reliable information transfer channel.

SUMMARY OF THE INVENTION

The above-mentioned objects are achieved by the inventive features that are stated in the accompanying claims.

The invention thus is based on an insight of the advantage of using special transaction messages which, independently and under the user's full control, are created by a user and which are of such nature that they can have been created by the user only, they cannot have been tampered with while being transferred to a receiver or addressee without such tampering being easily recognised (authentication) and can easily be validated after transfer for the purpose of finalising the desired transaction. According to the invention, the sender uses a unique smart card assigned to him, with a private key stored therein (whose public equivalence in an asymmetrical cryptographic system is generally available) in order to provide a transaction message created by the sender with a digital signature which is unique to the sender, whereupon the signed transaction message can be transferred in an arbitrary manner.

Only a lawful user of the smart card can activate this to be signed, thereby satisfying a basic identity requirement. The digital signature further entails a data lock which prevents the message from being tampered with without this being recognised in a subsequent authentication by using the generally available public key, which belongs to the user. The user's independent creating of the transaction message means full control of the contents of the message. The invention thus requires that sensitive information, such as a card number, in the transmitted transaction message be connected to a digital signature to make the information at issue usable. Without connection to a digital signature, the information thus is basically of no value and consequently cannot be misused for false network transactions, even if the information could be caught by a person not concerned in connection with a transmission of the transaction message. Basically, it is irrelevant how the transmission takes place. This means an approach which is completely opposite to today's striving for the provision of special, reliable, i.e. encrypted, communication systems for transmitting transaction messages via e.g. the Internet.

It is preferred that a transaction message according to the invention contains information on sender, transaction amount and receiver and preferably a variable piece of information, such as a serial number.

According to the invention, the user thus creates what can be said to be a signed "electronic cheque", which can be transmitted in an arbitrary manner and at an arbitrary point of time to an addressee or receiver.

Upon receipt, a transaction message according to the invention can be checked for authenticity by checking the digital signature, whereupon validation and charging or crediting the receiver with the transaction amount at issue can take place in an arbitrary, suitable manner, suitably according to the same principles as apply to the cashing of an ordinary cheque or to clearing in connection with a card purchase.

According to the invention, the transmitted, signed transaction message may contain the required transaction information as plain text, in which case the digital signature can, in a manner known per se, be provided on the basis of a condensate of the message information. This means that the subsequent authentication, validation and crediting on the receiver side will be facilitated since the required information is immediately available, such as information on sender, which makes it easy to fetch the correct public key for authentication of the digital signature.

If the digital signature is effected on the entire transaction message such that this is transmitted in encrypted form, the transmitted transaction message can be provided with special sender information which makes it possible on the receiver side to fetch the correct public key for authentication and conversion of the transaction message into plain text.

According to the invention, the transaction message may contain sender information of an arbitrary, suitable kind, such as at least one of the following pieces of information: a card number, a cash card number, a charge card number, a credit card number, an account number, an invoice number and an ID number. If the smart card utilised according to the invention is a card connected to an account, such as a credit card, it may be preferred to use the associated card number as sender information. As those skilled in the art realise, it is however possible to use any kind of information, which on the receiver side can easily be connected to a user identity and, consequently, to an associated account which is to be charged.

For the receiver information, basically the same applies. For instance, at least one of the following pieces of information may be involved: a card number, a cash card number, a charge card number, a credit card number, an account number, an invoice number and an ID number. Also in this case, it is sufficient that the information on the receiver side can be unambiguously related to a receiver of payment. It should be noted that transferring a transaction amount to a receiver need not entail the crediting of a receiver account, but it may also imply that e.g. an administrative unit receiving the transaction message, after authentication and validation, charges a sender account and sends to the receiver what may be considered a check or a postal order.

As described above, an essential feature of the present invention is that the sender, i.e. the user of the smart card, creates and signs the transaction message under his own control, i.e. basically independently of a connection to a communications network and of a computer dialogue with a receiver, although such a dialogue of course may take place in connection with the transmission of a signed transaction message. Consequently the transaction message is created preferably without connection to the communications network or off-line. This means that the sender fully controls which data are input for creating of the transaction message. As will be appreciated, the signing can be carried out only by the sender since in the normal case he is the only one to be able to activate his smart card and to release the signing. Regarding the transmission or handing over of the signed transmission message there are, however, no restrictions, as will be quite easily appreciated. For example, the user or some person assisting him may take the smart card with the signed transaction message present therein to send the message later, to send the message from some other place etc, that is to say there is a great freedom of choice. The signed transaction message could also be transferred to special intermediate materials or a transport medium to be transmitted to a receiver and/or addressee.

According to the invention, it is advantageous that the transaction message is created in the smart card. The transaction message may suitably be created by means of the software inserted in the smart card in advance and sender information preferably inserted in the card in advance, e.g. a card number. Suitably a new serial number is automatically created for each transaction message. The input of the necessary message information in the card may be carried out in different ways, for instance with the aid of the input means arranged on the smart card, the card advantageously consisting of a so-called advanced smart card. Information that is required for the transaction message can also be input with the aid of a protected card terminal, which advantageously may consist of the user's own terminal or computer provided with a card reader. Information that is necessary for the transaction message can also be input by means of a separate card communication unit, the latter preferably later also serving as card activator. Such a unit can advantageously be designed as a small portable unit, which the user may take along and which is utilised by the user when he wants to activate his card and/or input information in the card in surroundings where no protected card terminal is available.

Information which is required for the transaction message can also be input by means of a telecommunications unit controlled by the smart card, especially a mobile telecommunications unit, such as a mobile telephone device. In this context, the unit may also be used to transfer the signed transaction message, for instance by using a so-called SMS-type service.

The man skilled in the art realises that it is also possible to create the actual transaction message outside the smart card by using, for instance, one of the above-mentioned information input means. The created transaction message is then input in the smart card to be signed.

According to a first aspect of the present invention, a method is provided for carrying out electronic transactions, in which a sender of transaction messages is assigned a smart card with an associated unique identity and a private key stored in the card in a protected manner, and in which an associated public key is kept generally available, said method being characterised in that in connection with an electronic transaction under the sender's own control, preferably through his own input of message information, the sender creates a transaction message, which contains information necessary for the transaction, and, in his smart card, provides the created transaction message with his digital signature while using his own private key for the purpose of subsequent output and transmission of the transaction message.

According to a second aspect of the present invention, a smart card is provided for carrying out electronic transactions, said card comprising means for storing of card identification information, means for protected storing of a private key, means for storing of an asymmetrical algorithm, means for input of transaction information into the card, processor means for creating in the card a transaction message based on input transaction information, such as information on amount and receiver, and optionally information stored in the card, such as information on sender and preferably a serial number, and for providing the transaction message with a digital signature on the basis of said private key and said asymmetrical algorithm, and means for output of the signed transaction message.

According to a third aspect of the present invention, a combination is provided of a smart card and a user-controlled communication unit, which is arranged for communication with the smart card and with which the card is adapted to be combined with a view to producing an electronic transaction message, the card comprising means for protected storing of a private key, means for storing of an asymmetrical algorithm and processor means for providing a created transaction message with a digital signature based on said private key and said algorithm, and said communication unit comprising means for input of transaction information, and means being arranged in the communication unit and/or in the card for producing said transaction message.

A fourth aspect of the present invention involves use of a smart card with a private key stored therein and asymmetrical cryptographic algorithm for providing in the card, independently of the communications network, an electronic transaction message provided with a digital signature based on the private key.

Additional aspects of distinctive features of the invention will appear from the following detailed description of various embodiments with reference to the accompanying drawings.

DESCRIPTION OF EMBODIMENTS

Figure 1:
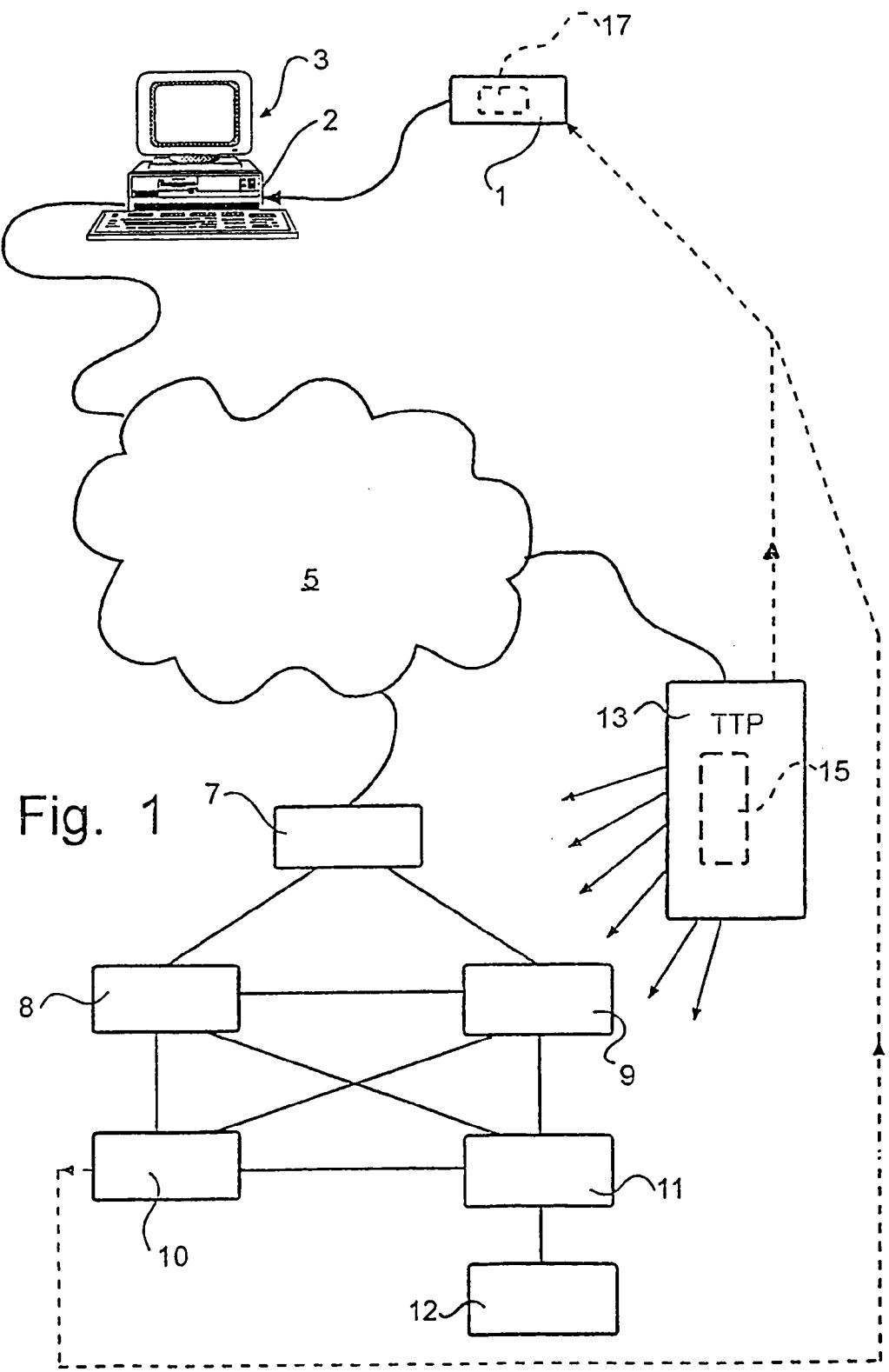
FIG. 1 is a schematic illustration of an example of the carrying out of electronic transactions by using an open network, such as the Internet, in accordance with an embodiment of the present invention.

FIG. 1 illustrates schematically a first embodiment of the invention, which can be used for credit card payment via an open network, such as the Internet, between a sender and a receiver included in a network. The sender has access to a smart card 1 and a computer 3 which is provided with a suitable card reader (indicated at 2), and which typically can be a home computer and is connected to the Internet 5. A network server 7 is connected to the network 5 and to various credit card administrators 8 and 9 included in the network. The latter are in conventional manner connected to each other and to various institutions keeping accounts, such as banks 10, 11. In the present example, the sender is supposed to have an account in the bank 10 and a credit card administered by the administrator 8, while the receiver 12 has an account in the bank 11 and a credit card administered by the administrator 9.

A trusted third party (TTP) 13 is network administrator and responsible for the necessary handling of keys. TTP 13 thus assigns to each user his private key which is stored in a protected manner in the user's card 1, and keeps a catalogue 15 available, from which the public key of each user can be collected.

The user's smart card 1, which also has a conventional credit card function, contains in a known manner memory and processor means in the form of one or more integrated circuits (indicated at 17), as well as conventional means for enabling communication between the card and a card reader when the card is placed in the latter.

In addition to the above-mentioned private key, said memory and processor means contain a cryptographic algorithm of an asymmetrical type, which can be a DES algorithm, and software for effecting the signing of a transaction message based on the private key and said cryptographic algorithm. The smart card 1 is activated in an arbitrary, suitable manner, for instance by means of a PIN input in the card, or biometrically.

When performing a transaction, the card 1 is placed in the card reader 17 of the computer 3 and the card is activated if this has not already been done. A transaction message can now be created in the smart card 1 and/or in a computer 3. If the creation takes place exclusively in the card, which from the viewpoint of security may be preferred, the card also contains software that is suitable for this purpose. In this case, the required information for the transaction message (especially regarding amount and receiver) is input via the keyboard of the computer 3 into the card.

If the actual transaction message is created in the computer, this has been provided with the software required for this purpose, which is suitably supplied to the user in connection with the issuance of the smart card. Also in this case, message information is input via the keyboard.

It is advantageous to use as sender information a card identification, such as the number of the smart card, which is automatically supplied by the card as the transaction message is being created. As receiver information the card number of the receiver can advantageously be input.

After creating the transaction message, it should be provided with a serial number and signed, which, as mentioned above, is effected in the card. If the actual message has been created in the card, it may be desirable, with a view to restricting the software that must be available in the card, to effect the digital signature on the actual message, whereby the message obtains the form of cryptographic text. The signed message which is then transferred must be able to supply information on the sender, thereby making it possible to collect the public key necessary for authentication, as will be described below. Especially if the transaction message is created in the sender's own protected computer, it may be suitable to generate the digital signature on a condensate of the actual message, which will be available as plain text and also can be transmitted as plain text.

The signed transaction message can now advantageously be given the form of e-mail and then be transmitted via the network 5 to the network server 7.

If the transaction message is available as plain text, the server 7 can, based on the information in the transaction message, directly send the signed message either to the sender's or the receiver's card administrator 8, 9, respectively, for the purposes of authentication and, if authenticity has been established, subsequent validation, charging the sender and crediting the sender with the transaction amount involved, while applying a suitable clearing procedure.

The authentication means that, for instance, the sender's card administrator fetches the sender's public key from a key catalogue of his own or the catalogue 15 of TTP 13 and, by means thereof and of the cryptographic algorithm involved, checks the digital signature of the message.

If the message received by the server is not available as plain text, the server 7 fetches from the catalogue 15 the public key belonging to the sender who can be identified by the received, signed transaction message, e.g. on the basis of special sender information such as a network identity or Internet identity. After conventional decrypting of the message by using the fetched public key, the server 7 has access to the information of the message as plain text and can send the message on for authentication etc, as mentioned above.

One more alternative is to provide the message sent on the network 5 with a stated address of the authorised card administrator, for instance 8, such that the server can directly direct the message to him for continued processing as described above. If the signed message is not available as plain text, the received message must also in this case provide such information that the correct public key can be fetched for authentication and decryption of the actual message.

Figure 2:
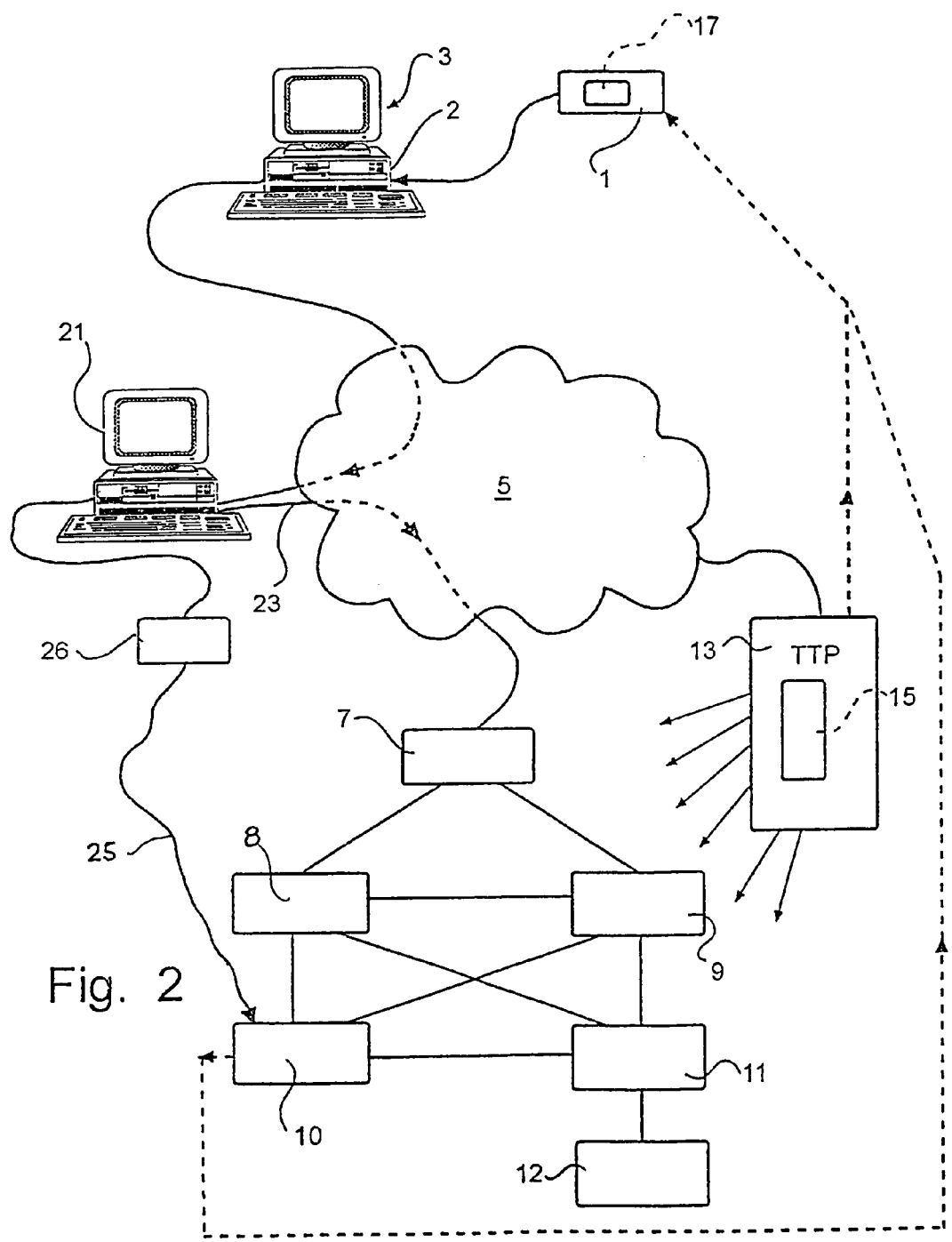
FIG. 2 is a schematic illustration of the same kind as in FIG. 1, exemplifying alternative ways of carrying out electronic transactions according to the invention.

FIG. 2 illustrates schematically a second embodiment of the invention, which uses basically the same configuration as in FIG. 1, although the transaction message from the sender is transmitted directly to a receiver's computer 21 via the network 5. The receiver sends the message on, which can be carried out via the network to the server 7, as indicated by the arrow 23, or by some other route as indicated by the arrow 25.

In this embodiment, it may be convenient that the actual message is available as plain text, such that the receiver can see the information therein even if he does not have immediate access to the sender's public key for authentication or decryption of the digital signature. If needed, the signed message can however be encrypted by the sender with a public key belonging to the receiver, in which case the receiver upon receipt decrypts the message by using his own private key and the associated cryptographic algorithm and then forwards the decrypted, but still signed message.

In case of a transport route 25 other than the network 5, it may be advantageous to use intermediate materials, for instance a disk (indicated at 26), which in some suitable and reliable manner, the receiver hands over to his card administrator or bank for continued processing in accordance with that described above. It will be appreciated that the receiver can collect a number of received transaction messages on such intermediate materials before taking steps for the continued processing.

Figure 3:
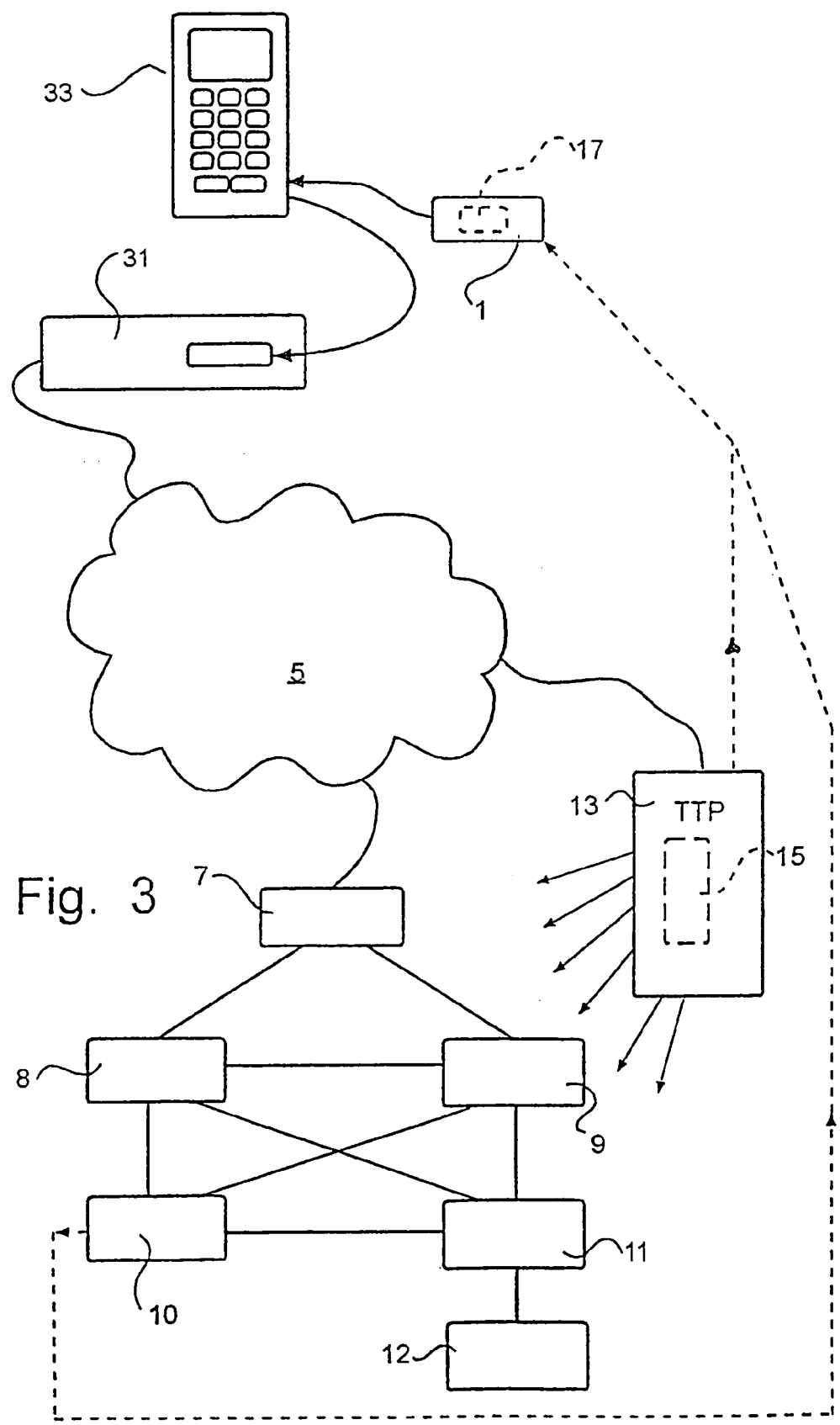
FIG. 3 is a schematic illustration of an example of the carrying out of electronic transactions by using a shop card terminal, according to a different embodiment of the present invention.

FIG. 3 illustrates schematically an embodiment of the invention which is suited for transactions via a foreign "terminal" 31 and which uses a user-controlled portable unit 33 for creating a transaction message.

The unit 33 consists of a combined activator and information inputting means for the smart card. The unit 33 is in a suitable manner arranged for communication with the card 1, for instance by comprising an integrated card reader, into which the card is inserted. The unit 33 further has a keyboard and a display.

When paying in e.g. a shop, the card is inserted in the unit 33 and activated, for instance, by inputting a PIN code by means of the keyboard of the unit. By means of the keyboard, the necessary payment information is also input, such as amount and receiver. If the transaction message is both created and signed in the actual card, the actual information will be transferred to the card. If the actual message and optionally a condensate thereof are to be created in the unit 33 for the purposes of transferring to and signing in the card 1, the unit is provided with processor means and the software required for this purpose.

The card with the signed transaction message is now removed from the unit 33 and inserted into the shop's reader/terminal 31, from which the message is transmitted for continued processing in the same manner as described above. Accepted authentication and validation may suitably result in a receipt being sent back to the terminal.

It will be appreciated that the terminal 31 could, of course, communicate with the server 7 in some other manner than via the network 5, for instance via a protected connection.

Figure 4:
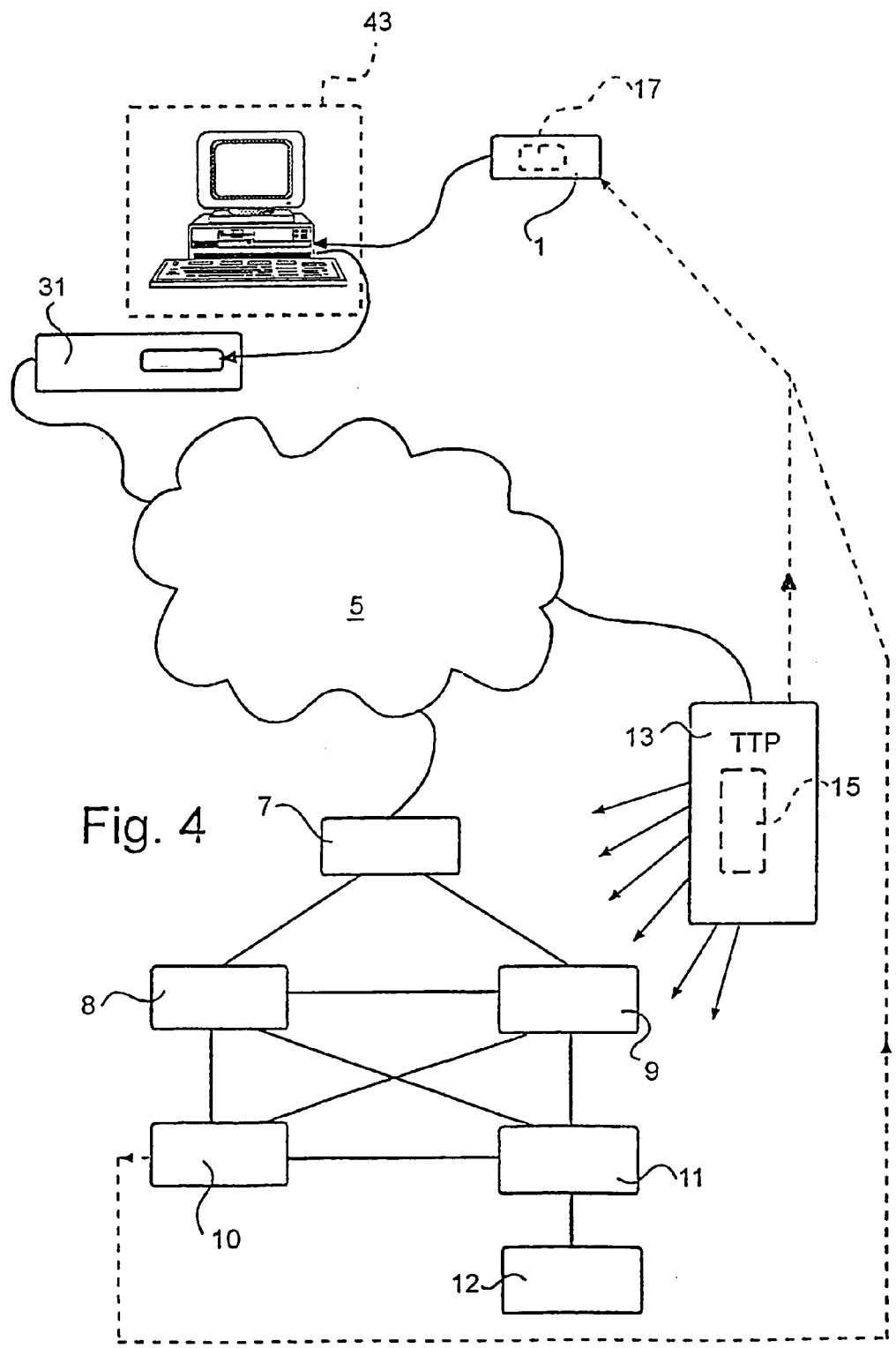
FIG. 4 is a schematic illustration of the same kind as in FIG. 3 of another example of the carrying out of electronic transactions by using a shop card terminal, according to the present invention.

FIG. 4 illustrates a variant of the embodiment shown in FIG. 3. The unit 33 in FIG. 3 is replaced by a protected, preferably off-line computer or terminal 43, which can be arranged in, for instance, a shop and permits off-line, secure creation of a transaction message in a way similar to that described in connection with FIG. 3, for the purposes of input in a shop card terminal 31.

Figure 5:
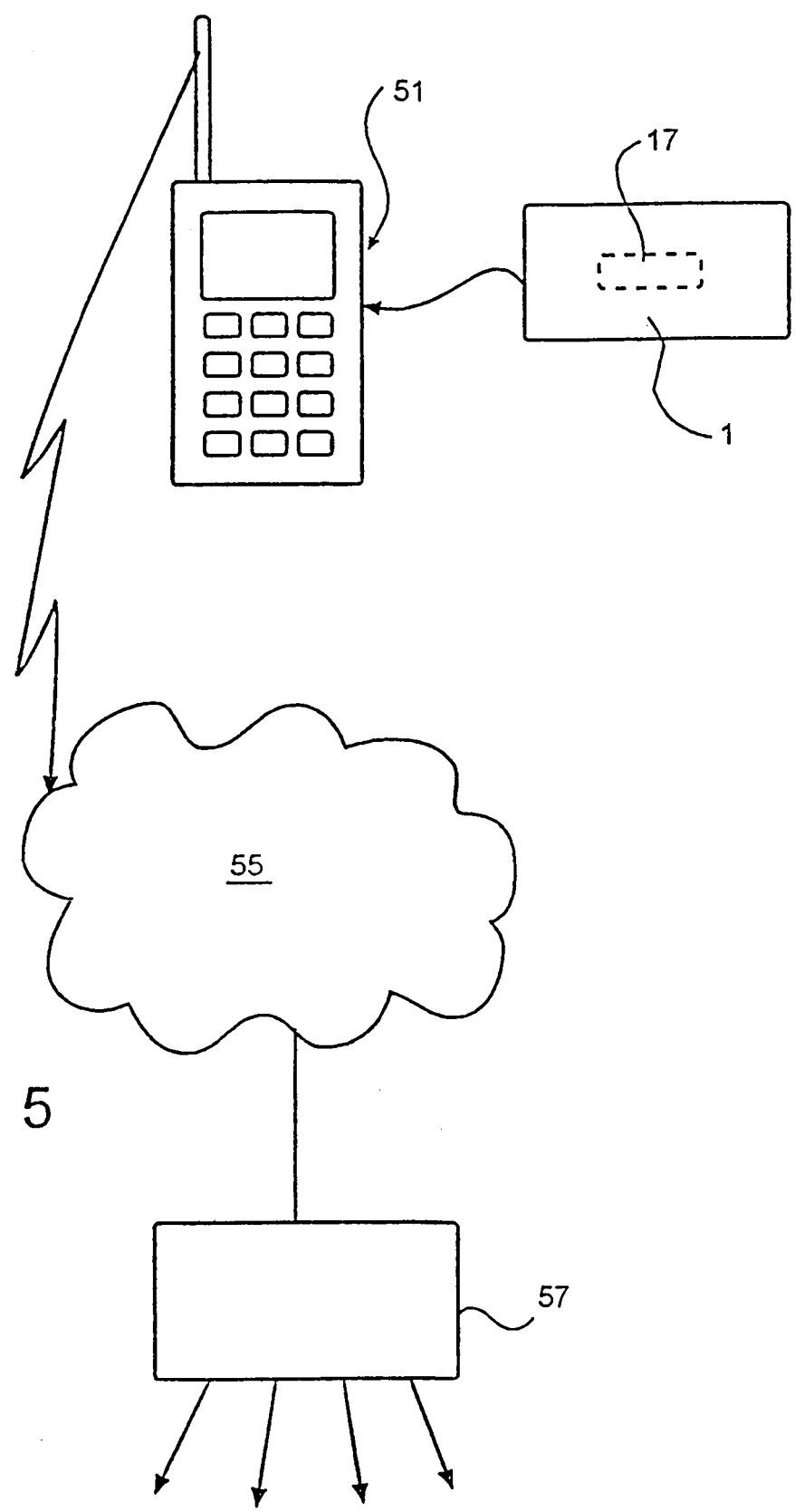
FIG. 5 is a schematic illustration of an example of the carrying out of electronic transactions by using a mobile telephone system, according to one more embodiment of the present invention.

FIG. 5 illustrates an embodiment of the present invention which involves the use of a mobile telephone device 51 and an associated mobile telephone network 55. The mobile telephone device comprises, in addition to a mobile telephone function, also such an activating and input function as described in connection with the unit 33 in FIG. 3. The mobile telephone function is preferably also controlled by the smart card.

With the aid of the telephone function, the signed transaction message is transmitted to a unit or central unit 57, which effects continued processing of the transaction message, for instance, in accordance with that described in connection with the preceding Figures.

The transmission of the transaction message can advantageously take place while using a so-called SMS service or the like of the mobile telephone network.

The unit 57 could also be a special central unit, which after authentication etc. effects payments based on the received transaction messages.

Figure 6:
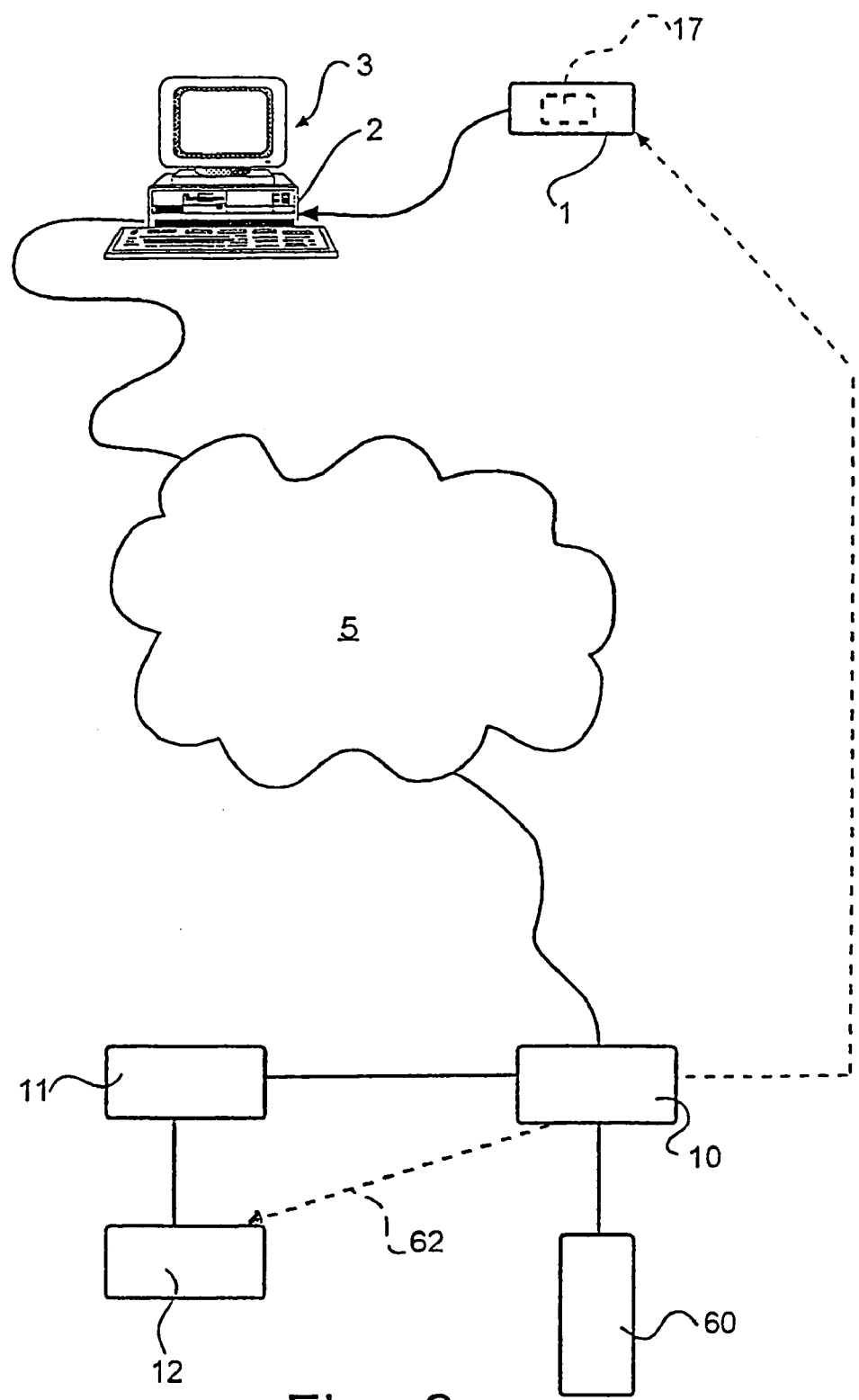
FIG. 6 is a schematic illustration of an example of the carrying out of electronic transactions by using an open network for direct contact with a bank, according to another embodiment of the present invention.

FIG. 6 illustrates an embodiment of the present invention which advantageously can be used to effect payment orders. At a sender's, i.e. payer's place, signed transaction messages are created as described, in this case exemplified with the same method as in FIG. 1. The transaction message is transmitted to the sender's bank 10 keeping the account, which in a catalogue 60 has access to the sender's public key. It will be appreciated that the bank could be card issuer and key administrator and that the sender information in the transaction message can suitably consist of the sender's bank account number.

Upon receipt of a transaction message and authentication thereof, the sender's bank 10 provides for, by a clearing procedure, the payee, who is identified in the transaction message suitably by the associated bank account number, being credited with the amount at issue, i.e. the receiver's account in the receiver's bank 11 being credited with the amount at issue.

Another alternative possibility is that the sender's bank 10 sends a delivery order directly to the receiver 12 based on, for instance, receiver information in the transaction message. This alternative is indicated by means of the dashed line 62 in FIG. 6.

In the embodiment according to FIG. 6 it may be convenient to encrypt the transmitted, signed transaction message, thereby increasing the security. The sender then uses the public key of the bank 10 and preferably the same cryptographic algorithm as is used for signing. As will be appreciated, the bank 10 can immediately carry out decryption by using its private key.

If the bank 10 is administrator of the sender's pair of keys, i.e. has both the public key and the private key belonging to the sender, the sender can alternatively carry out the encryption of the signed message with the aid of his public key. The bank 10 can then decrypt the transmitted message by using the sender's private key, which is collected from a catalogue, before authentication is carried out by using the sender's public key.

Figure 7:
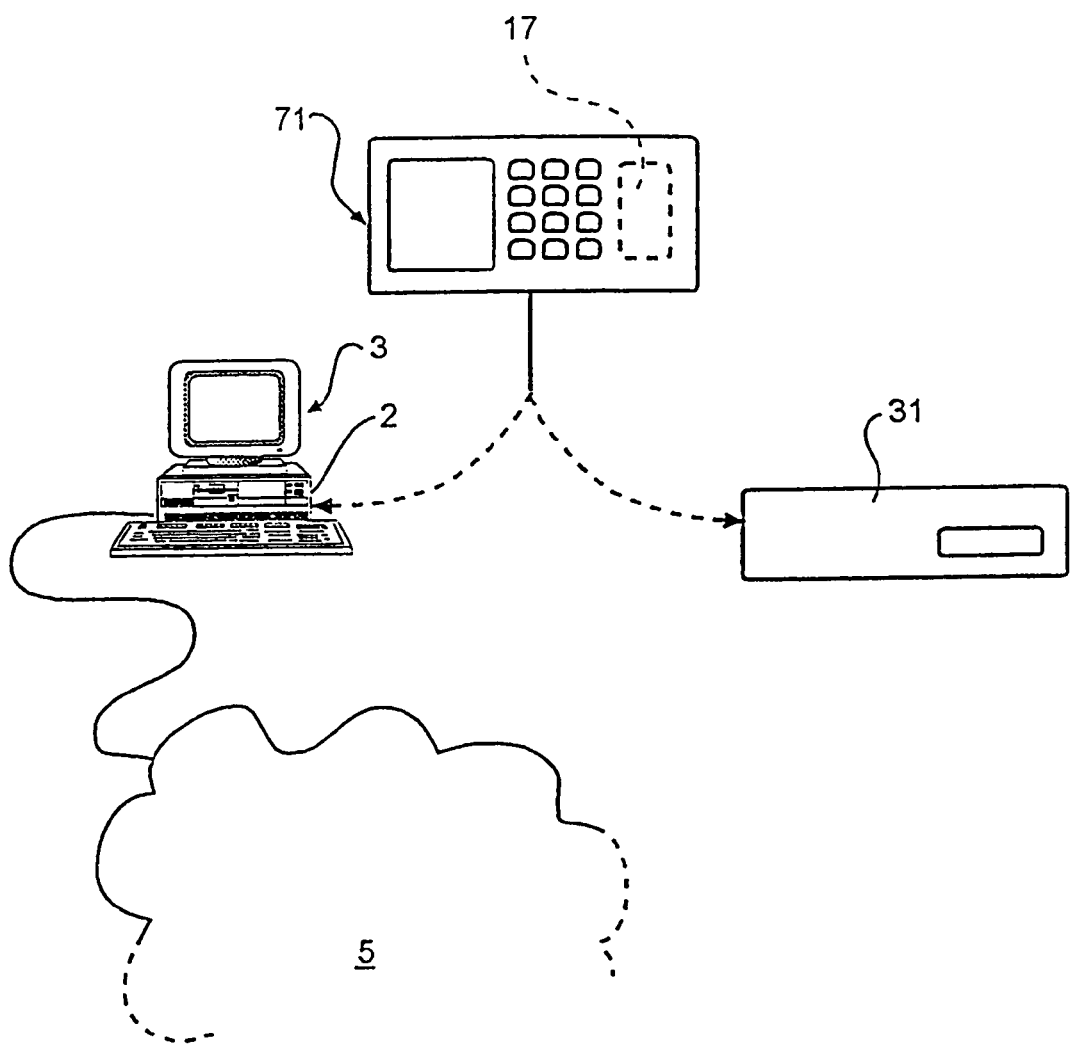
FIG. 7 is a schematic illustration of examples showing how an advanced smart card can be used to carry out electronic transactions in accordance with the present invention.

Finally, FIG. 7 illustrates schematically the use of a so-called advanced smart card in connection with the invention. The advanced smart card 71 also has a keyboard and a display, which allows that a signed transaction message can be created in the card completely without external aids. Subsequently the card can be inserted into e.g. a computer or a terminal for the purposes of forwarding the message and continued processing in accordance with that described above.

Although the invention has been illustrated by a number of embodiments, the invention is of course not restricted thereto, and changes and modifications are feasible within the scope of the appended claims. Thus, individual features from the various embodiments may be brought together in new combinations within the scope of the inventive idea.

The invention claimed is:

1. A method for performing electronic transactions via a communications network, in which a sender of transaction messages is assigned a smart card with an associated unique identity and a private key stored in the card in a protected manner, and in which an associated public key is kept generally available, characterised in that in connection with an electronic transaction under the sender's own control, preferably through his own input of message information, the sender, independently of any connection to a communications network and without computer dialogue with a receiver, creates, on the basis of entered transaction information, a transaction message, which contains information necessary for the transaction, the transaction message being created in the smart card with the aid of software previously stored in the smart card, and, in his smart card, provides the created transaction message with his digital signature while using his own private key for subsequent output and transmission of the transaction message.

2. A method as claimed in claim 1, characterised in that the transaction message contains information on sender, receiver, amount and preferably a transaction serial number.

3. A method as claimed in claim 2, characterised in that the transaction message is created off-line, i.e. not connected to the communications network that is issued for the subsequent transmission of the transaction message.

4. A method as claimed in claim 3, characterised in that the transaction message is created off-line.

5. A method as claimed in claim 1 characterised in that the transaction message is created off-line, i.e. not connected to the communications network that is used for the subsequent transmission of the transaction message.

6. A method as claimed in claim 1, characterised in that the transaction message is created with the aid of sender information inserted in the card in advance.

7. A method as claimed in claim 6, characterised in that information required for the transaction message is input with the aid of input means arranged on the smart card, the card preferably being a so-called advanced smart card.

8. A method as claimed in claim 1, characterised in that information required for the transaction message is input with the aid of input means arranged on the smart card, the card preferably being a so-called advanced smart card.

9. A method as claimed in claim 1, characterised in that information necessary for the transaction message is input with the aid of a protected card terminal.

10. A method as claimed in claim 1, characterised in that information necessary for the transaction message is input with the aid of a separate card communication unit, the latter preferably also being a card activator.

11. A method as claimed in claim 1, characterised in that information necessary for the transaction message is input with the aid of a telecommunications unit controlled by the smart card, especially a mobile telecommunications unit such as a mobile phone.

12. A method as claimed in claim 1, characterised in that the transaction message contains sender information in the form of at least one of the following pieces of information: a card number, a cash card number, a charge card number, a credit card number, an account number, an invoice number and an ID number.

13. A method as claimed in claim 1, characterised in that the transaction message contains receiver information in the form of at least one of the following pieces of information: a card number, a cash card number, a charge card number, a credit card number, an account number, an invoice number and an ID number.

14. A method as claimed in claim 1, characterised in that the signed transaction message is sent to a card or account administrator regarding the sender or receiver, that the digital signature of the transaction message is authenticated by using the public key, which is assigned to the one who is identified as sender by the transmitted transaction message, and that in case of authenticity, the receiver is credited with the transaction amount by a clearing process.

15. A method as claimed in claim 14, characterised in that the signed transaction message is first sent to the receiver, who optionally after his own checking of the digital signature of the message forwards the signed transaction message to said card or account administrator.

16. A method as claimed in claim 1, characterised in that the signed transaction message is encrypted by using a public key belonging to the addressee, to whom the transaction message is sent, that the encrypted, signed transaction message is sent to the addressee, that the addressee by using his private key decrypts the signed transaction message, that the digital signature of the transaction message is authenticated by using the public key which is assigned to the one who is identified as sender by the transmitted transaction message, and that the receiver, in case of authenticity, is credited with the transaction amount by a clearing process.

17. A method as claimed in claim 16, characterised in that the addressee is the receiver, that the receiver, after decryption, sends the signed transaction message to a card or account administrator, whereupon said authentication takes place.

18. A method as claimed in claim 1, characterised in that the signed transaction message is encrypted by using the sender's public key and is provided with sender information and is then sent to a card or account administrator, who has the sender's private key and who preferably has issued the user's smart card, that said administrator decrypts the received encrypted message by using said private key, that authentication of the digital signature of the decrypted transaction message takes place by using the public key, which is assigned to the one who is identified as sender by the transmitted transaction message, and that the receiver, in case of authenticity, is credited with the transaction amount by a clearing process.

19. A method as claimed in claim 1, characterised in that the signed transaction message is sent non-encrypted, especially via a public communications network, such as the Internet or a telecommunications network.

20. A method as claimed in any one of claims 1,2,5 and 6, 8–19, characterised in that the signed transaction message is sent via a mobile telephone network, especially by using a so-called SMS service.

21. A method as claimed in claim 1, characterised, in that the signed transaction message is sent by e-mail.

* * * * *